A. E. MASTIN.
ELECTRIC HEATING STOVE.
APPLICATION FILED FEB. 19, 1912.
1,049,750.
Patented Jan. 7, 1913.
2 SHEETS—SHEET 1.
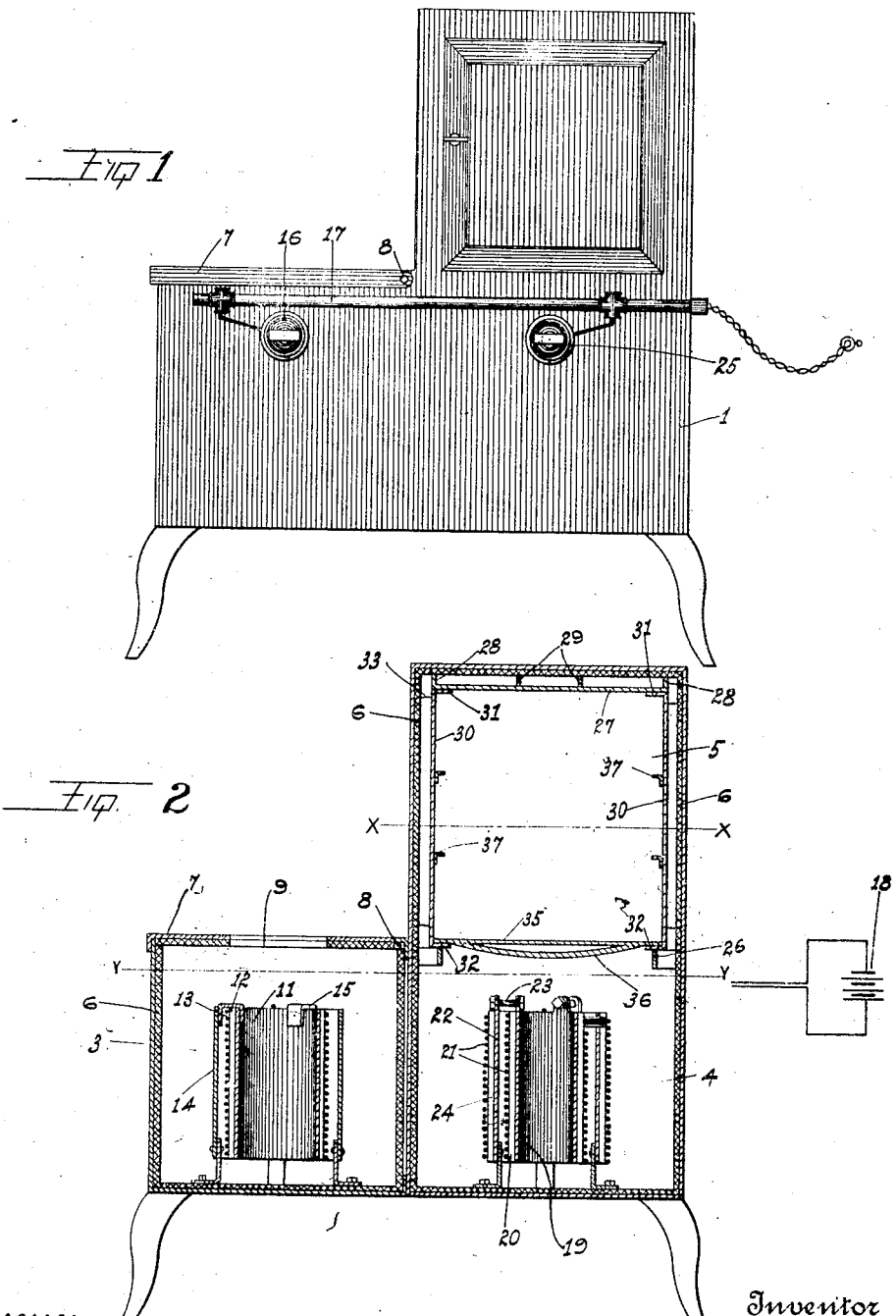

A. E. MASTIN.
ELECTRIC HEATING STOVE.
APPLICATION FILED FEB. 19, 1912.
1,049,750.
Patented Jan. 7, 1913.
2 SHEETS—SHEET 2.
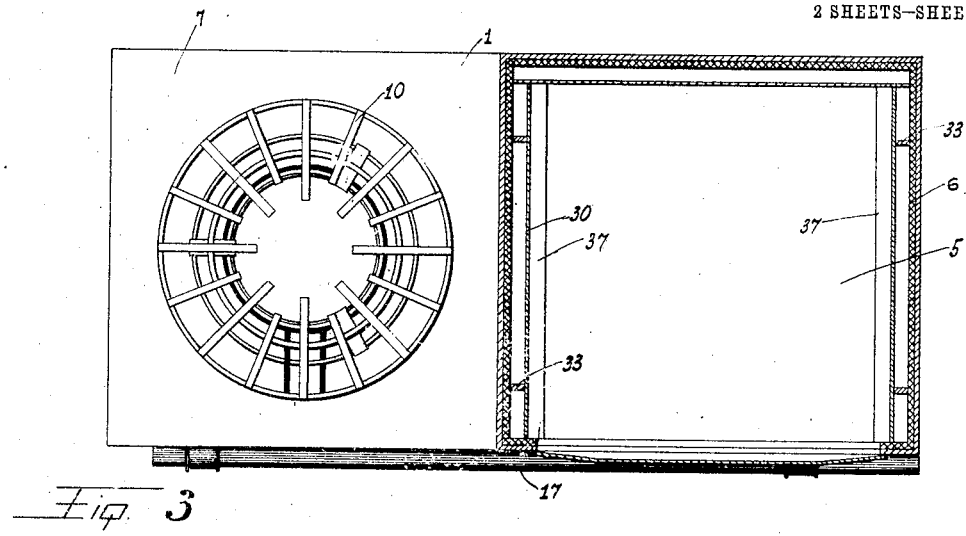
Fig. 3
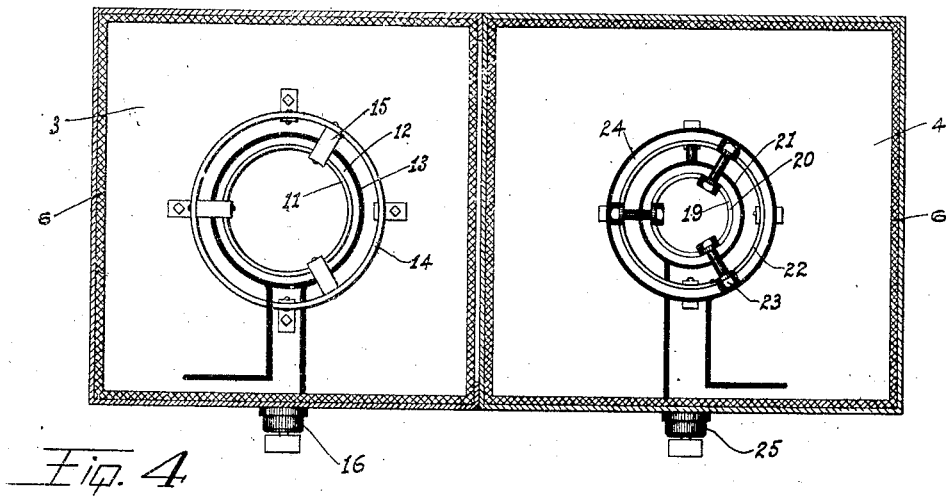
Fig. 4
Fig. 5
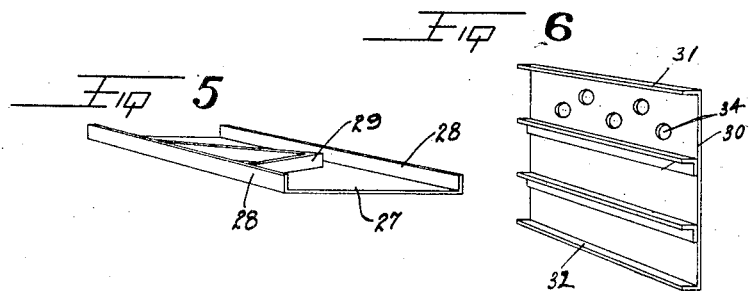
Fig. 6
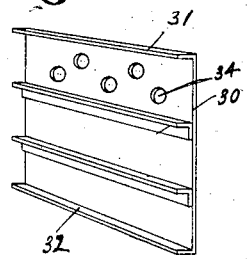
Witnesses
Clarence Smith
Inventor
A. E. Mastin
Attorney

UNITED STATES PATENT OFFICE.

ALBERT E. MASTIN, OF SACRAMENTO, CALIFORNIA.

ELECTRIC HEATING-STOVE.

1,049,750.  Specification of Letters Patent.  Patented Jan. 7, 1913.

Application filed February 19, 1912. Serial No. 678,493.

*To all whom it may concern:*

Be it known that I, ALBERT E. MASTIN, a citizen of the United States, residing at Sacramento, in the county of Sacramento, State of California, have invented certain new and useful Improvements in Electric Heating-Stoves; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in stoves of all kinds and characters and particularly to an electrically heated stove which may be used either for heating or cooking purposes, the object of the invention being to produce a stove of such structure and relative arrangement of parts as will permit the use of a specially designed electric heater whereby an efficiency of heat may be had in the stove with a minimum expense of fuel.

A further object of the invention is to produce a particular form of heater especially adapted for the purpose of heating and cooking stoves.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claims.

In the drawings similar characters of reference indicate corresponding parts in the several views.

Figure 1 is a front elevation of my complete stove. Fig. 2 is a vertical longitudinal section of the same. Fig. 3 is a sectional view taken on a line X—X of Fig. 2. Fig. 4 is a sectional view taken on a line Y—Y of Fig. 2. Fig. 5 is a perspective view of the top wall of an oven. Fig. 6 is a perspective view of a side wall of an oven.

Referring now more particularly to the characters of reference on the drawings, 1 designates the body of the stove which in the structure shown in the drawings is divided into two bottom compartments 3 and 4 and an oven compartment 5 disposed above the compartment 4, the whole of said compartments 3, 4 and 5 being provided with an inner lining of asbestos 6. The top of the compartment 3 is provided with a lid 7 hinged as at 8 to permit of its being opened, which lid is provided with a central orifice 9 over which may be placed a grate 10 for the purpose of holding the cooking utensils. Within the compartment 3 is an electrical heater composed of an inner metallic tubular member 11 having an outer lining of asbestos 12, wrapped around which is a resistant wire 13. Spaced from this structure is another metallic tubular member 14 secured to said member 11 by straps 15, which member 14 acts as a radiator for the heat from the wire 13. The wire 13 connects at each end with a switch 16 and from thence passes through a conduit 17 to the source of electrical energy 18. In the compartment 4 is another electrical heater comprising an inner metallic tubular member 19 covered with asbestos 20 around which is wrapped wire 21.

The numeral 22 designates an outer metallic tubular member secured to the tubular member 19 by bolts 23. The member 22 is surrounded by asbestos lining 24 and the wire 21 is then wrapped around this asbestos lining 24. The wire 21 connects at its free end with a switch 25 and thence passes into the conduit 17. Projecting through the compartments 4 and 5 are flange members 26.

The numeral 27 designates a top wall for the compartment 5 and is provided with flanges 28 which hold it away from said compartment 5 there being a V-shaped distributing flange 29 to distribute the heat which might pass between the member 27 and the top of the compartment 5.

The numeral 30 designates side walls for the compartment 5 provided at their upper ends with flanges 31 which support the member 27 and with bottom projecting flange members 32 which rest on the members 26. The members 30 are also provided with inwardly projecting flanges 33 which engage the sides of the compartment 25 and hold members 30 spaced therefrom to permit the heat from the compartment 4 to pass therebetween and between the top of the compartment 5 and member 27 as described in order to evenly heat the member 5. The tops of the members 30 are provided with holes 34 to let the heat into the compartment 5.

The numeral 35 designates a bottom plate for the compartment 5 and rests on the flanges 32 and is provided with a curved under surface 36 for the purpose of distributing the heat to throw it around the side and top walls, as described. The members 30 have inwardly projecting shelves 37 to receive the grates, as described.

In practice the heat from the heater in the compartment 3 may be utilized for general cooking purposes while the heater in compartment 4 is utilized to heat the oven compartment 5, the wall structure of which permits the heat to be distributed evenly to give perfect satisfaction. Or if desired the same heaters may be used for purely heating stoves.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device of the character described comprising a body member divided into two lower compartments and an upper compartment disposed over one of said lower compartments and an electrical heater in each of said lower compartments, as described.

2. A device of the character described comprising a body member divided into lower compartments and an upper compartment disposed over one of said lower compartments, said upper compartment having outer and inner walls, the inner walls being spaced from the outer walls, there being a space communicating from one of said lower compartments to the space between the inner and outer walls of said upper compartment, and an electric heater in said lower compartments, as described.

3. A device of the character described comprising a member having two compartments one below the other, an electrical heater in lower one of said compartments, projecting shelves between said compartments and spaced from the walls of said member, a top wall spaced from the top of the upper compartment, a V-shaped flange member projecting between said top wall and the top of said compartment, side walls having lower flanges resting on said shelves and upper flanges supporting said top wall, said side walls being spaced from the sides of said compartment, a bottom member resting on the lower flanges of said side walls and a curving plate disposed on the under side of said bottom member, as described.

In testimony whereof I affix my signature in presence of two witnesses.

ALBERT E. MASTIN.

Witnesses:
PERCY S. WEBSTER,
CLARENCE SMITH.

---

Copies of this patent may be obtained for five cents each, by addressing the "Commissioner of Patents, Washington, D. C."